United States Patent Office 3,192,109
Patented June 29, 1965

3,192,109
METHOD FOR CONTROLLING INSECTS AND HELMINTHS WITH TRIAZINYL COMPOUNDS
Robert L. Goulding, Jr., Corvallis, Oreg., and Carl R. Tanner, Lafayette, Calif., assignors to California Research Corporation, San Francisco, Calif., a corporation of Delaware
No Drawing. Filed Aug. 23, 1963, Ser. No. 304,217
10 Claims. (Cl. 167—53)

This invention relates to a method for controlling parasites attacking warm-blooded domestic animals and for improving the growth characteristics of such domestic animals. More particularly, this invention concerns the use of phosphate esters of 4,6-diamino-1,3,5-triazinyl compounds.

Domestic animals are subject to attack by a great variety of parasites. Such parasites as fleas, flies, lice, ticks, screws-worms, cattle grubs, ox warbles, as well as helminthic parasites, such as stomach worms and gastrointestinal worms, are well known. Commercial losses due to loss of weight in the animal, injury to the hide, and mortality because of these parasites are extremely high. With pets, the lack of well being or the mortality cannot be accounted for in dollars.

It has now been found that compounds of the following formula:

I)
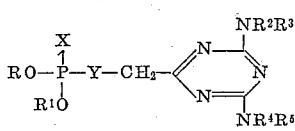

wherein R and $R^1$ are lower alkyl and may be the same or different, and $R^2$, $R^3$, $R^4$ and $R^5$ are hydrogen or lower alkyl and may be the same or different, and X and Y are chalcogen of atomic number of 8 to 16 and may be the same or different (chalcogen is intended to be oxygen or sulfur), are effective in the control of parasites which attack domestic warm-blooded animals.

Included in lower alkyl groups are methyl, ethyl, propyl, isopropyl, pentyl, isohexyl, etc.

Preferred compounds have the following formula:

(II)
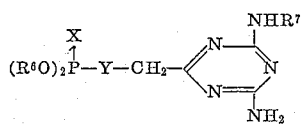

wherein $R^6$ is lower alkyl from 1 to 2 carbons, i.e., methyl or ethyl, $R^7$ is hydrogen or lower alkyl from 1 to 2 carbons, i.e., methyl or ethyl, and X and Y are either oxygen or sulfur.

Particularly preferred compounds have the following formula:

(III)
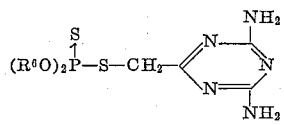

wherein $R^6$ can be methyl or ethyl and is preferably methyl.

Compounds included within the generic scope of this invention are O,O-dimethyl S-(4-dimethylamino-6-amino-1,3,5-triazin-2-yl)methyl phosphorothioate, O,O-diethyl S-(4,6-bis-methylamino)-1,3,5-triazin-2-yl)methyl phosphorodithioate, O,O-dipropyl S-(4,6-bis-(diethylamino)-1,3,5-triazin-2-yl)methyl phosphorothioate, etc.

The dosage to be used will depend on the animal to be treated, the parasite to be destroyed, the method of application, as well as the particular compound used. High dosages are to be avoided for, at values much above those suggested, sporadic mortality occurs.

The triazinyl compounds used in this invention may be administered orally or parenterally. When given orally, they may be in any convenient and customary oral form of medication, such as a capsule, tablet, or as a drench. They may also be incorporated in the animal's feed or drinking water. Moreover, they may be introduced into the body of the animal by hypodermic or intramuscular injection or may be absorbed through the skin by means of a dip, spray, or wash. The manner of administration of these compounds is not particularly important so long as the prescribed amounts of them are introduced into the body of the animal where they may be distributed throughout the body by the action of the circulatory system.

When the triazinyl compounds are orally administered, the total amount to be applied will depend on whether the dose is given as a single dose or as multiple doses over a period of several days. With calves, in a single dose, some improvement is found with 5 mg./kg. (When weight/weight is used as a unit, it is intended to signify unit weight of triazinyl compound/unit weight of subject.) However, it is preferred that at least 25 mg./kg. be used. The preferred range of dosage per calf is in the order of 25 to 75 mg./kg. Amounts in excess of 75 mg./kg. have occasionally resulted in mortality of the subject. When using multiple dosages, the dosage per day should probably not be less than ½ mg./kg. and preferably should be at least 3 mg./kg. When administering the triazinyl compounds on succeeding days, the total dosage should probably not exceed 75 mg./kg. With sheep and dogs, higher dosages than with calves may be used. With sheep, a single dosage as high as 100 mg./kg. may be used. With dogs, even higher dosages may be used, particularly as a total dosage when multiple administration is applied.

In the preparation of solid feed compositions, the compounds may be mechanically mixed with a finely divided eatable, such as flour or animal feed, or a solid surface-active dispersing agent, such as finely divided bentonite, fuller's earth or attapulgite. These compositions may be administered in the form of capsules or tablets or dispersed in an animal feed and such feed used to supply a part or the entire ration. Alternatively, the compounds may be dissolved in an organic solvent, the resulting mixture dispersed in an animal feed and the feed dried to remove the solvent material. Also, the compounds may be dispersed in an eatable oil, such as coconut oil, olive or peanut oil, and the resulting mixture dispersed in the feed.

As mentioned previously, the compounds may be applied parenterally. Spraying the animal with an aqueous dispersion or using a dip are illustrative of methods of applying the compounds used in this invention. The concentration of these compounds in the spray or dip may vary widely, usually in the range of 0.25 to 10%, being dependent on the necessity that a sufficient amount of the compounds be applied to the subject. When using an aqueous dispersion, surface-active dispersing agents, such as ionic or nonionic emulsifying agents, may be used. Suitable surface-active dispersing agents include the glycerol and sorbitan esters of fatty acids, and the polyoxyalkylene derivatives of fatty alcohols and sorbitan esters. The aqueous compositions may contain one or more water-miscible oils as a solvent for the compounds of this invention. In such compositions the water, oil and emulsifying agent constitute on aqueous emulsion.

The compounds of this invention may be used singly or as mixtures.

The following examples illustrate the invention and are not to be construed as limiting.

Example I

A Hereford heifer weighing 510 pounds was treated with a dose of O,O-dimethyl S-(4,6-diamino-1,3,5-triazin-2-yl)methyl phosphorodithioate (which shall be referred to as Menazon) 80 W.P.[1] at the rate of 75 mg. Menazon per kg. of body weight. Dosage was by means of two orally administered gelatin capsules. At the time of treatment there were four warbles contaning grubs nearly ready to drop and twenty warbles containing less mature individuals present in the back of the calf. About 36 hours after treatment the heifer showed signs of intoxication. However, after 4 days the animal began gradually to return to normal. Twelve days after the treatment no live grubs were found in the animal upon inspection. No grubs were found in this animal for the balance of the annual grub season.

Example II

Three Hereford heifers with an average weight of about 338 pounds were sprayed with a 1.5% Menazon 80 W.P. solution at a pressure of approximately 100 p.s.i. About 1.5 gallons/head was used to completely saturate the hair coat. Two and one-half months later the control subjects showed an average of 7.2 grubs/head while the three calves treated with Menazon were entirely grub free.

Example III

Three Hereford heifers averaging about 340 pounds were fed an alfalfa meal-bran mix containing about 0.03% by weight concentration of Menazon. The heifers were fed the Menazon fortified feed over a 6-day period, the dosages averaging between about 7.8 and 9.8 mg./kg. About 60 days later, while the controls showed an average of 7.2 grubs/head, the treated calves were entirely grub free.

Example IV

The calves in Example II were also checked for their louse population. The long-nosed cattle louse, the little blue cattle louse and the biting louse were all present. With the sprayed calves in Example II, perfect control was obtained for greater than a 3-week period. With the fed calves, almost perfect control was obtained for the same period.

Example V

To a 22 pound dog, infested with oriental rat fleas, was administered 50 mg./kg. of body weight of Menazon on 4 succeeding days as part of the normal daily ration. With the fourth dose, 100% flea mortality was achieved.

In a similar test a 16 pound dog was fed with a Menazon fortified feed containing .25 g./lb. of feed. This resulted in a dosage of approximately 21 mg./kg, which was administered over a 5-day period. Two days after the final dosage, 100% flea mortality was achieved.

Example VI

Oriental rat fleas were allowed to feed through nylon gauze on rats which had been fed Menazon in the daily ration. The Menazon was dissolved in a solution of 1 part acetone and 3 parts corn oil, and 0.5 ml./100 gms. body weight was administered to the rat. The fleas were exposed to the rats for 24 hours and then held an additional 24 hours before assessing mortality. By using varying dosages the $LD_{50}$, the dosage necessary for 50% mortality in fleas, was found to be approximately 200 mg./kg. of body weight. A comparable test with Ronnel, O,O-dimethyl O-(2,4,5-trichlorophenyl)phosphorothioate, showed an $LD_{50}$ of 350 mg./kg. of body weight.

[1] Menazon 80 W.P. indicates a sample having 80% by weight of the active ingredient and formulated as a wettable powder.

Example VII

To a 5.1 kg. female dog was administered 15 mg./kg. per day of O,O-dimethyl S-(4-amino-6-methylamino-1,3,5-triazin-2-yl)methyl phosphorodithioate on four succeeding days as part of the normal daily ration. About 2 hours following the second dose, two cells of 25 fleas each were placed on the shoulders of the subject. The fleas were removed on the day following the fourth dose. They were held for 24 hours and mortality was determined on the basis of mortal responses. A 90% flea mortality was observed as compared to a control of 10%.

Example VIII

To a 7 kg. dog was administered 15 mg./kg. per day of O,O-dimethyl S-(4-amino-6-methylamino-1,3,5-triazin-2-yl)methyl phosphorothioate on four succeeding days as part of the normal daily ration. About 2 hours following the second dose, 2 cells of 25 fleas each were placed on the shoulders of the subject. The fleas were removed on the day following the fourth dose. They were held for 24 hours and mortality was determined on the base of mortal responses. 100% flea mortality was observed, as compared to a control showing only 10% mortality.

The use of the compounds of this invention provides an effective way of controlling parasites which attack domestic warm-blooded animals. Total mortality of the parasite may be achieved, with significant protection maintained for long periods of time.

This application is a continuation-in-part of copending application Serial No. 208,129, filed July 6, 1962, now abandoned.

As will be evident to those skilled in the art, various modifications on this process can be made or followed, in the light of the foregoing disclosure and discussion, without departing from the spirit or scope of the disclosure or from the scope of the following claims.

We claim:

1. A method for controlling insects and helminths attacking domestic warm-blooded animals, which comprises introducing into the body of the animal a chemotherapeutic dosage of O,O-dimethyl S-(4,6-diamino-1,3,5-triazin-2-yl)methyl phosphorodithioate.

2. A method for controlling insects and helminths attacking domestic warm-blooded animals, which comprises introducing into the body of the animal a chemotherapeutic dosage of a compound of the following formula:

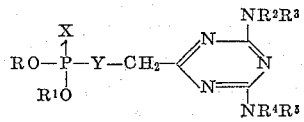

wherein R and $R^1$ are lower alkyl from 1 to 6 carbons, $R^2$, $R^3$, $R^4$ and $R^5$ are selected from the group consisting of hydrogen and lower alkyl of from 1 to 6 carbons, and X and Y are chalcogen of atomic number of 8 to 16.

3. The method according to claim 2 wherein Y is sulfur.

4. The method according to claim 2 wherein X and Y are sulfur.

5. The method according to claim 2 wherein X and Y are sulfur and R and $R^1$ are methyl.

6. The method according to claim 2 wherein X and Y are sulfur, R and $R^1$ are methyl and $R^3$, $R^4$ and $R^5$ are hydrogen.

7. A method for controlling insects and helminths attacking domestic warm-blooded animals, which comprises introducing into the body of the animal a chemotherapeutic dosage of O,O-dimethyl S-(4-amino-6-methylamino-1,3,5-triazin-2-yl)methyl phosphorothioate.

8. A method for controlling insects and helminths attacking domestic warm-blooded animals, which comprises introducing into the body of the animal a chemotherapeutic dosage of O,O-dimethyl S-(4-amino-6-methylamino-1,3,5-triazin-2-yl)methyl phosphorothioate.

9. A method for controlling insects and helminths attacking domestic warm-blooded animals, which comprises introducing into the body of the animal a chemotherapeutic dosage of O,O-diethyl S-(4,6-bismethylamino-1,3,5-triazin-2-yl)methyl phosphorodithioate.

10. A method for controlling insects and helminths attacking domestic warm-blooded animals, which comprises introducing into the body of the animal a chemotherapeutic dosage of O,O-dimethyl S-(4-dimethylamino-6-amino-1,3,5-triazin-2-yl)methyl phosphorothioate.

References Cited by the Examiner

UNITED STATES PATENTS 3,099,106   7/63   Edgar _____ 167—33

OTHER REFERENCES

Frear: Pesticide Index, 1961, College Science Publishers, State College, Pa., page 61.

JULIAN S. LEVITT, *Primary Examiner.*

FRANK CACCIAPAGLIA, JR., *Examiner.*

UNITED STATES PATENT OFFICE
CERTIFICATE OF CORRECTION

Patent No. 3,192,109

June 29, 1965

Robert L. Goulding, Jr., et al.

It is hereby certified that error appears in the above numbered patent requiring correction and that the said Letters Patent should read as corrected below.

Column 1, line 19, for "screws-worms" read -- screw-worms --; column 2, line 69, for "on aqueous emulsion" read -- an aqueous emulsion --; column 4, line 24, before "mortality" insert -- flea --; same column 4, line 71, for "phosphorothioate" read -- phosphorodithioate --.

Signed and sealed this 21st day of December 1965.

(SEAL)
Attest:

ERNEST W. SWIDER
Attesting Officer

EDWARD J. BRENNER
Commissioner of Patents